Figure 1:
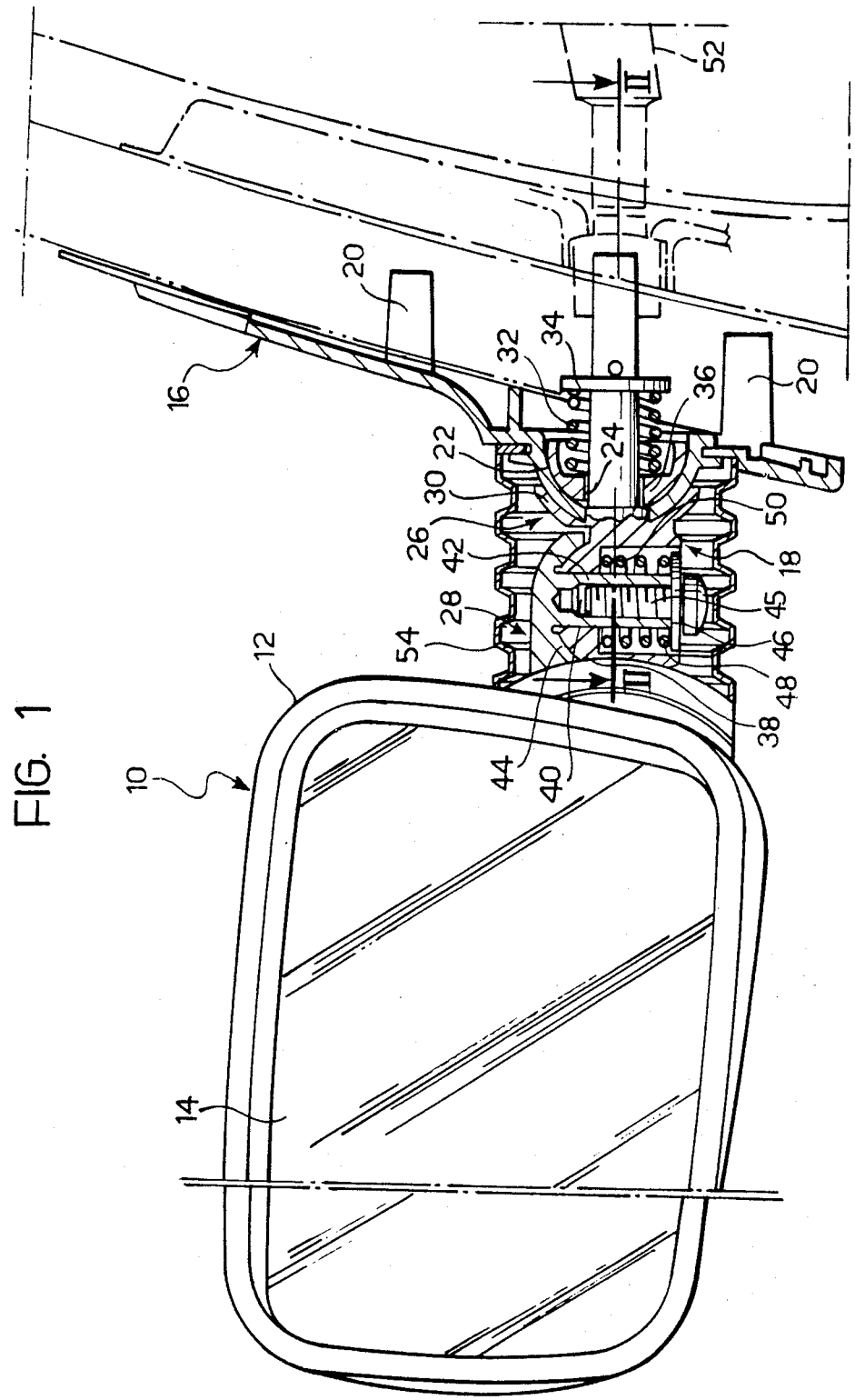

United States Patent [19]

Vigna et al.

[11] Patent Number: 4,651,965
[45] Date of Patent: Mar. 24, 1987

[54] EXTERNAL REAR-VIEW MIRROR FOR MOTOR VEHICLES

[75] Inventors: Giuseppe Vigna; Piercarlo Spadarotto, both of Turin, Italy

[73] Assignee: Fiat Auto S.p.A., Italy

[21] Appl. No.: 780,758

[22] Filed: Sep. 27, 1985

[30] Foreign Application Priority Data

Sep. 27, 1984 [IT] Italy .............................. 53862/84[U]

[51] Int. Cl.⁴ .............................................. A47G 1/24
[52] U.S. Cl. ..................................... 248/483; 74/491; 248/478; 350/635
[58] Field of Search ............ 248/483, 481, 479, 475.1, 248/476, 478, 468, 487, 485; 74/491; 350/631, 635, 636; 403/70, 131, 125, 124

[56] References Cited

U.S. PATENT DOCUMENTS

| | | | |
|---|---|---|---|
| 3,512,746 | 5/1970 | Vitaloni et al. | 248/483 |
| 4,213,675 | 7/1980 | Pilhall | 248/478 X |
| 4,347,014 | 8/1982 | Smith | 403/125 X |
| 4,401,289 | 8/1983 | Fisher et al. | 248/483 |
| 4,504,165 | 3/1985 | Moeremans | 248/483 X |
| 4,523,736 | 6/1985 | Manzoni | 248/483 |
| 4,558,840 | 12/1985 | Manzoni | 350/635 X |

*Primary Examiner*—Ramon O. Ramirez
*Attorney, Agent, or Firm*—Sughrue, Mion, Zinn, Macpeak and Seas

[57] ABSTRACT

An external rear-view mirror for motor vehicles, which can be adjusted from inside, has a body connected through a first articulated joint to a support member by an arm that can be oriented relative to this support member by a second articulated joint. The two articulated joints comprise two hemispherical elements formed on the orientable arm and cooperating with corresponding hemispherical elements carried by the body and the support member respectively.

4 Claims, 2 Drawing Figures

EXTERNAL REAR-VIEW MIRROR FOR MOTOR VEHICLES

The present invention relates in general to external rear-view mirrors for motor vehicles, which can be adjusted from inside.

In particular, the invention concerns a mirror of the type comprising a support member intended to be fixed to the body of a vehicle, and a body which carries a reflecting element and is connected through a first articulated joint to the support member by an arm that can be oriented relative to the support member by means of a second articulated joint.

In conventional mirrors of the type defined above, the two articulated joints are formed by a large number of parts which are rather complicated and expensive to manufacture and assemble.

The object of the present invention is to provide a rear-view mirror of the type specified above which is simpler and cheaper to manufacture and assemble.

According to the invention, this object is achieved by virtue of the fact that the second articulated joint comprises a substantially hemispherical projection formed on the support member and passed through by the orientable arm, and a complementary, substantially hemispherical annular element carried by the arm and urged into sliding contact with the hemispherical projection by first resilient thrust means, and the fact that the first articulated joint comprises a substantially hemispherical head carried by the arm and through which is rotatably engaged an articulation pin carried by a complementary hemispherical element rigid with the body of the mirror and urged against the hemispherical head by second resilient thrust means.

Advantageously, the hemispherical head and the annular element with a hemispherical surface are formed integrally with the orientable arm.

Figure 2:
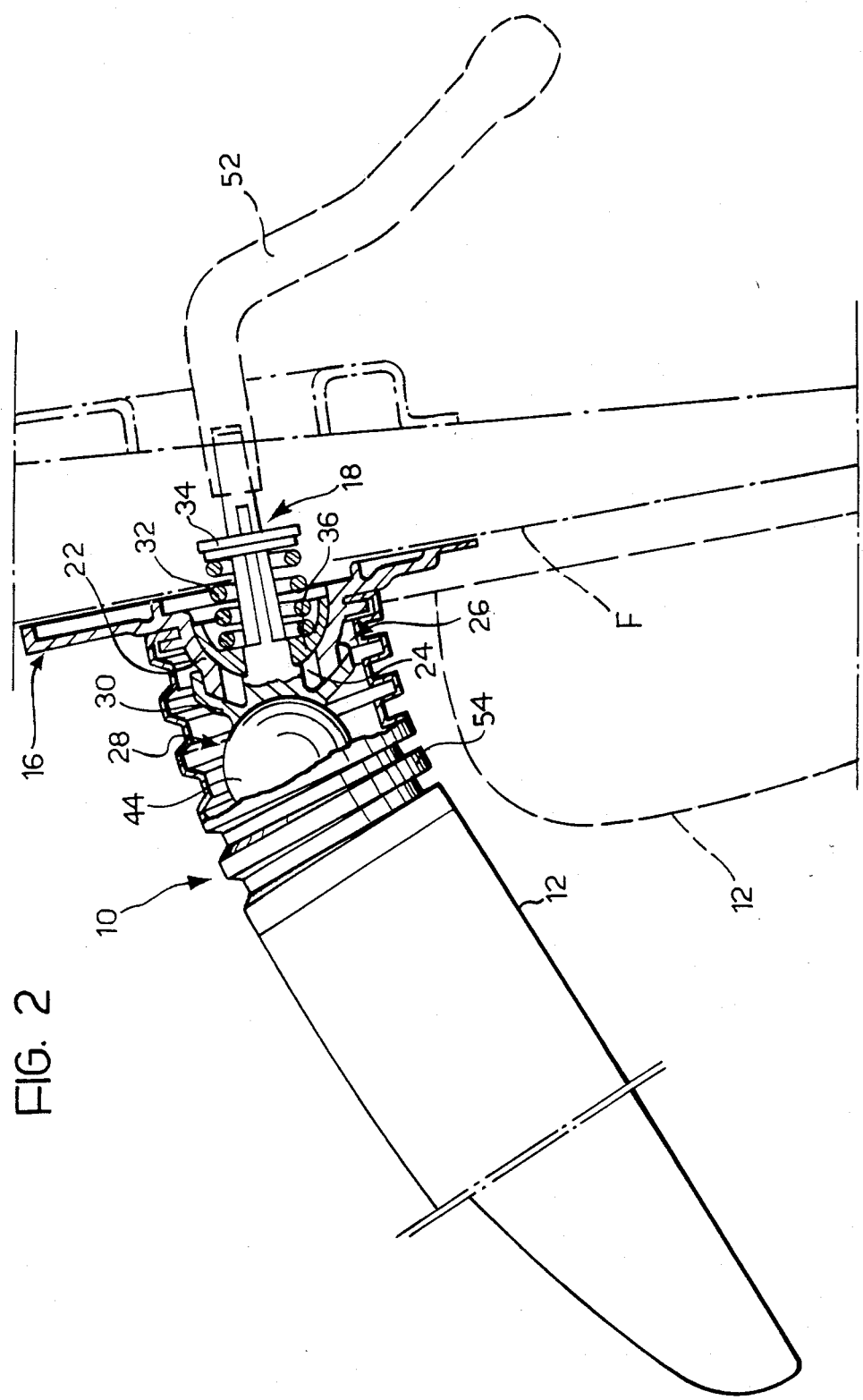

The invention will now be described in detail with reference to the appended drawings, provided purely by way of non-limiting example, in which:

FIG. 1 is a partially-sectioned front elevational view of a rear-view mirror according to the invention, and FIG. 2 is a partially sectioned view along the line II—II of FIG. 1.

In the drawings, a rear-view mirror, generally indicated 10, is fixed externally to a side F of the body of a motor vehicle.

The mirror 10 comprises essentially a body 12, normally of moulded plastics material, carrying a reflecting plate 14 and connected to the side F by a support member 16 through an arm, generally indicated 18.

The support member 16 is constituted by a shaped plate, also normally of plastics material, provided with fixing appendages 20 for its attachment to the body. The plate 16 has on its outside a substantially hemispherical integral projection 22, the function of which will be explained below, having a central aperture 24 through which the arm 18 extends.

The arm 18, as well as serving to support the body of the mirror, allows angular displacement of the body 12 about an articulated joint 26 whereby the body 12 can be oriented from inside the vehicle, and about an articulated joint 28 whereby the body 12 can be withdrawn from its extended position, shown in full outline in FIGS. 1 and 2, to its folded back position, shown in broken outline in FIG. 2, in which it is parallel to the side F.

Both articulated joints 26 and 28 are constituted by spherical elements partly formed directly on the arm 18. In particular, the articulated joint 26 comprises a substantially hemispherical annular element 30 having a form complementary to that of the hemispherical projection 22 of the plate 16. The annular element 30 is urged into frictional sliding contact with the projection 22 by a helical compression spring 32 interposed, on the side of the plate 16 opposite the body 12, between a bearing collar 34 carried by the arm 18 and a hemispherical member 36 inserted within the projection 22.

The articulated joint 28, which is inserted between the joint 26 and the body 12, comprises a substantially hemispherical head 38 formed at the end of the arm 18 and having an aperture 40 with a substantially vertical axis, through which is rotatably engaged an articulation pin 42 carried by an element 44 rigid with the body 12 and having a hemispherical form complementary to that of the head 38.

The articulation pin 40 is hollow and engaged therein is a screw 45 carrying a collar 46 against which bears a helical compression spring 48 that reacts at its opposite end against an internal bearing surface 50 of the hemispherical head 38. Clearly, the spring 48 keeps the hemispherical element 44 in frictional sliding contact with the hemispherical head 38, allowing the body 12 to rotate about the axis of the pin 42.

The end of the arm 18 opposite the hemispherical head 38 projects into the interior of the vehicle and forms a control knob 52 the movement of which permits the arm 18, and hence the body 12 of the mirror, to be oriented relative to the plate 16 by means of the articulated joint 26.

The articulated joints 26 and 28 are protected externally by a bellows 54, normally of plastics material, anchored at one end to the body 12 and at the other to the plate 16.

It will be evident from the foregoing that the rear-view mirror according to the invention comprises relatively few parts which can be manufactured and assembled simply and cheaply. In particular and to advantage, the hemispherical element 30 of the articulated joint 26 and 38 of the articulated joint 28 are formed integrally with the arm 18, which further simplifies the assembly of the mirror.

We claim:

1. An external rear-view mirror for motor vehicles, which can be adjusted from inside the vehicle, comprising a support member intended to be fixed to the body of a vehicle, a body, a reflecting element carried by the body, a first articulated joint, an orientable arm connecting said body to the support member through said first articulated joint, and a second articulated joint for orienting the said arm relative to the support member, wherein:

the second articulated joint comprises a substantially hemispherical projection formed on the support member and passed through by the orientable arm, a complementary substantially hemispherical annular element carried by the arm, and first resilient thrust means, urging said hemispherical annular element into sliding contact with said hemispherical projection, the first articulated joint comprises a substantially hemispherical head carried by the orientable arm, a complementary hemispherical element rigid with the body of the mirror, an articulation pin projecting from said complementary hemispherical element and rotatably engaged through said hemispherical head, and second resilient thrust means urging said hemispherical element against said hemispherical head.

2. A rear-view mirror according to claim 1, comprising a bearing collar carried by the arm and a hemispherical member inserted within said hemispherical projection of the support member on the side opposite the annular element, and said first resilient thrust means comprising a helical compression spring acting between the said bearing collar and the said hemispherical member.

3. A rear-view mirror according to claim 1, wherein the articulation pin has a hollow cavity, a screw engaged within the cavity of said pin, a bearing collar is carried by said screw, and said hemispherical head is provided with an internal bearing surface; said second resilient thrust means comprising a helical compression spring interposed between said bearing collar and said internal bearing surface.

4. A rear-view mirror according to claim 1, wherein said hemispherical head and said substantially hemispherical annular element are formed integrally with the arm.

* * * * *